(12) United States Patent
Song et al.

(10) Patent No.: US 11,089,349 B2
(45) Date of Patent: Aug. 10, 2021

(54) APPARATUS AND METHOD FOR PLAYING BACK AND SEEKING MEDIA IN WEB BROWSER

(71) Applicant: HANWHA TECHWIN CO., LTD., Seongnam-si (KR)

(72) Inventors: Byung In Song, Changwon-si (KR); Sweung Won Cheung, Changwon-si (KR); Do Hyun Kim, Changwon-si (KR); Mi Ju Park, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 27 days.

(21) Appl. No.: 15/845,311

(22) Filed: Dec. 18, 2017

(65) Prior Publication Data

US 2018/0213274 A1    Jul. 26, 2018

Related U.S. Application Data

(60) Provisional application No. 62/457,203, filed on Feb. 10, 2017.

(30) Foreign Application Priority Data

Jan. 20, 2017 (KR) .......... 10-2017-0009963
Jul. 11, 2017 (KR) .......... 10-2017-0087651

(51) Int. Cl.
*H04N 21/2743* (2011.01)
*H04N 21/6587* (2011.01)
(Continued)

(52) U.S. Cl.
CPC ......... *H04N 21/2743* (2013.01); *G06F 16/40* (2019.01); *G06F 16/44* (2019.01);
(Continued)

(58) Field of Classification Search
CPC ........... H04N 21/2743; H04N 21/2393; H04N 21/47202; H04N 21/47217;
(Continued)

(56) References Cited

U.S. PATENT DOCUMENTS 7,853,980 B2   12/2010  Pedlow, Jr. et al.
9,247,317 B2    1/2016  Shivadas et al.
(Continued)

FOREIGN PATENT DOCUMENTS

CN          1883206 A    12/2006
CN        105453573 A     3/2016
(Continued)

OTHER PUBLICATIONS

Communication dated May 30, 2018 issued by the Korean Patent Office in counterpart Application No. 10-2017-0087651.
(Continued)

*Primary Examiner* — Michael R Telan
(74) *Attorney, Agent, or Firm* — Sughrue Mion, PLLC

(57) ABSTRACT

A media playback apparatus for playing media on a web browser may be provided. The media playback apparatus may include: a receiving unit that receives media data generated in a media service apparatus; a first media restoring unit that decodes the received media data by a first decoder embedded in the web browser; a second media restoring unit that decodes the received media data by a second decoder written in a script, which is parsed by the web browser; a user interface configured to receive a user command; and a decoding controller configured to control the first media restoring unit to decode the received media data in response to the user command corresponding to a playback command and control the second media restoring unit to decode the received media data in response to the user command corresponding to a seek command.

17 Claims, 11 Drawing Sheets

(51) Int. Cl.
*H04L 29/08* (2006.01)
*H04N 21/238* (2011.01)
*G06F 16/40* (2019.01)
*G06F 16/958* (2019.01)
*H04N 21/239* (2011.01)
*H04N 21/472* (2011.01)
*G06F 16/44* (2019.01)
*G06F 40/221* (2020.01)

(52) U.S. Cl.
CPC ............ *G06F 16/958* (2019.01); *H04L 67/02* (2013.01); *H04N 21/238* (2013.01); *H04N 21/2393* (2013.01); *H04N 21/47202* (2013.01); *H04N 21/47217* (2013.01); *H04N 21/6587* (2013.01); *G06F 40/221* (2020.01)

(58) Field of Classification Search
CPC ............ H04N 21/6587; H04N 21/238; H04N 21/433; H04N 21/4402; H04N 21/643; H04N 21/8543; G06F 16/44; G06F 16/40; G06F 16/958; G06F 40/221; H04L 67/02
See application file for complete search history.

(56) References Cited

U.S. PATENT DOCUMENTS

| | | | | |
|---|---|---|---|---|
| 9,542,368 | B1* | 1/2017 | Dorwin | H04L 47/801 |
| 2003/0227460 | A1* | 12/2003 | Schinnerer | G09G 5/363 |
| | | | | 345/539 |
| 2006/0045189 | A1* | 3/2006 | Kim | H04N 5/4401 |
| | | | | 375/240.26 |
| 2007/0133942 | A1* | 6/2007 | Moors | G11B 27/005 |
| | | | | 386/346 |
| 2012/0317473 | A1 | 12/2012 | Pullen et al. | |
| 2013/0074131 | A1* | 3/2013 | Cerveau | H04N 21/2387 |
| | | | | 725/88 |
| 2014/0068096 | A1* | 3/2014 | Shivadas | H04N 21/23439 |
| | | | | 709/231 |
| 2014/0282777 | A1* | 9/2014 | Gonder | H04L 65/605 |
| | | | | 725/109 |
| 2014/0359679 | A1 | 12/2014 | Shivadas et al. | |
| 2016/0134945 | A1* | 5/2016 | Gower | H04N 21/234345 |
| | | | | 725/88 |
| 2016/0323608 | A1* | 11/2016 | Bloch | H04N 21/632 |
| 2018/0014041 | A1* | 1/2018 | Chen | H04N 21/2347 |

FOREIGN PATENT DOCUMENTS

| | | |
|---|---|---|
| JP | 5477655 B2 | 4/2014 |
| KR | 10-2005-0098461 A | 10/2005 |
| WO | 2016/137989 A1 | 9/2016 |

OTHER PUBLICATIONS

Communication dated Mar. 9, 2020 issued by the State Intellectual Property Office of P.R. China in counterpart Chinese Application No. 201810049063.4.

* cited by examiner

APPARATUS AND METHOD FOR PLAYING BACK AND SEEKING MEDIA IN WEB BROWSER

CROSS-REFERENCE TO THE RELATED APPLICATIONS

This application claims priority from U.S. Provisional Application No. 62/457,203 filed on Feb. 10, 2017 and Korean Patent Application Nos. 10-2017-0009963 filed on Jan. 20, 2017 and 10-2017-0087651 filed on Jul. 11, 2017 in the Korean Intellectual Property Office, the disclosures of which are incorporated herein by reference in their entireties.

BACKGROUND

1. Technical Field

Apparatuses and methods consistent with exemplary embodiments relate to seeking multimedia data, and more particularly, to seeking multimedia data on a frame-by-frame basis by using a decoder implemented in JavaScript without a plug-in in a web browser supporting Hypertext Markup Language 5 (HTML5).

2. Description of the Related Art

In order for a user to play back media data on a web browser through the Internet, there is provided a method of using a plug-in in which a codec, a decoder, a renderer and the like are written in native code. As representative examples of web browser plug-ins, ActiveX and Netscape Plugin Application Programming Interface (NPAPI) are widely used.

ActiveX was developed by Microsoft using a combination of two technologies: Component Object Model (COM) and Object Linking and Embedding (OLE). However, in a narrow sense, it refers to an ActiveX control used in the form of an add-on in Internet Explorer which is a web browser. ActiveX is used to play media in the Internet Explorer web browser.

NPAPI is an application programming interface (API) developed for Netscape browsers, and is similar in functionality to ActiveX of Internet Explorer. NPAPI is an API provided for using an external application program in a plug-in format in order to enhance the function of a web browser, and was used primarily for the web environment in its embryonic stage. In other words, it was developed to play music and videos on early web pages. For example, there are Java Applet, Adobe Flash, Real Player and the like.

However, since a plug-in is sometimes abused by hackers to distribute malicious code, many mainstream web browsers no longer support plug-ins. In the case of NPAPI, Google, which produces and distributes Chrome, no longer supports NPAPI after the release of Chrome version 45. In addition, ActiveX is no longer supported by Microsoft Edge browser, which is the default browser for Windows 10.

In order to play media in a web browser without plug-in support, media data may be transmitted using Moving Picture Experts Group Dynamic Adaptive Streaming over Hypertext Transfer Protocol (MPEG-DASH), which is a protocol supported by Hypertext Markup Language version 5 (HTML5) Media Source Extensions (MSE), and performing decoding using the HTML5 video element. The video element provides an environment in which media can be played without a plug-in in a web browser.

Since the video tag is provided as a native video tag in a web browser, it can be used in harmony with other techniques, such as JavaScript or CSS, of a web browser. The video tag provides various properties that can be accessed in JavaScript, and the user can implement various functions (e.g., media loading, playback, pause and playback speed conversion) of media playback using the HTML5 video tag and JavaScript.

Also, a function of seeking media data can be implemented. To this end, the currentTime property of the video tag may be mainly used. The currentTime property is a property that allows to obtain a current position of the media being played back. It is possible to seek media by setting the currentTime. For example, if the currentTime value is set to currentTime+10, it can be moved to an image after 10 seconds from the current playback time.

Meanwhile, a function of stopping the media playback at a specific time point in the media seeking can be implemented by additionally using a timeUpdate event. The timeUpdate event occurs when the playback position of the media changes. That is, this event occurs when the time is updated in the currentTime property, and the frequency of this event varies between about 4 Hz and 66 Hz, depending on the system load. Therefore, the user can acquire a desired still image with a minimum unit of 250 ms through the timeUpdate event.

As described above, the HTML5 video tag provides various functions for playing back and seeking media on a web browser with high playback performance without a plug-in. However, this method may not be suitable for detailed seeking on a frame-by-frame basis. The video tag basically performs decoding by receiving media on the basis of a container obtained by packaging a plurality of frames. Therefore, a time interval of 250 ms or more occurs when a user requests seeking on a frame-by-frame basis.

Therefore, it may be necessary to design a system for playing back a media stream without a plug-in on a web browser and enabling detailed seeking on a frame-by-frame basis when there is a seek request from a user.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a method for seeking media data on a frame-by-frame basis without using an API of a video tag and a plug-in.

Further, one or more exemplary embodiments provide a technique to solve a problem that buffering needs to be performed again when a direction of seeking media is switched to a direction before a current playback point due to a unidirectional buffer which buffers only media after the current playback point.

According to an aspect of an exemplary embodiment, there is provided a media playback apparatus for playing media on a web browser, including at least one processor to implement: a receiving unit configured to receive media data generated in a media service apparatus using a communication protocol which supports web services; a first media restoring unit configured to decode the received media data by a first decoder embedded in the web browser; a second media restoring unit configured to decode the received media data by a second decoder written in a script, the script being configured to be parsed by the web browser; a user interface configured to receive a control command that controls the received media data; and a decoding controller configured to control the first media restoring unit to decode the received media data in response to the control command corresponding to a playback command and control the second media restoring unit to decode the received media data in response to the control command corresponding to a seek command.

According to an aspect of another exemplary embodiment, there is provided a media service apparatus for transmitting real-time live video or stored video to a media playback apparatus in real time, the media service apparatus including: a module storage unit configured to store a script module to play back the real-time live video or the stored video on a web browser of the media playback apparatus, the script module being written in a script which is configured to be parsed by the web browser; and at least one processor to implement: a module transmitting unit configured to transmit the script module to the media playback apparatus in response to a connection between the media service apparatus and the media playback apparatus being established; a packetizing unit configured to packetize the real-time live video or the stored video to generate a transmission packet; and a web server configured to establish the connection and transmit the transmission packet to the media playback apparatus in response to a control command being received from the media playback apparatus, wherein the script module is configured to decode the transmission packet by a different decoder among a plurality of video decoders executed in the media playback apparatus according to a determination of whether the control command received from the media playback apparatus is a playback command or a seek command.

According to the exemplary embodiments, it may be possible to perform media seeking on a frame-by-frame basis without using a plug-in. Thus, it is suitable for security and conforms to the trend of excluding plug-ins from web browsers.

According to the exemplary embodiments, the user can seek an image on the basis of a frame, which is a minimum unit of a video sequence. That is, since it is possible to seek media with the highest precision, the present disclosure may be very useful in fields such as a video surveillance system requiring detailed image analysis.

According to the exemplary embodiments, additional buffering is not required even if the seeking direction is changed while performing seeking on a frame-by-frame basis. Therefore, it may be possible to easily and stably perform media seeking in a manner suitable for a non-plug-in environment with minimal memory usage.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
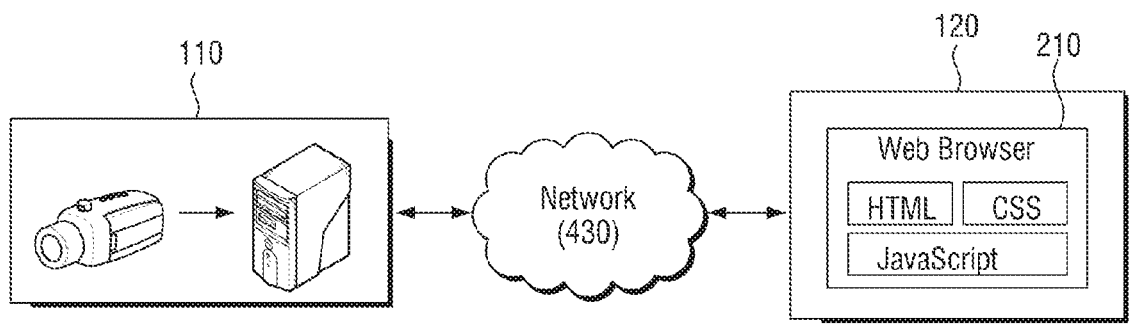
FIG. 1 illustrates a system for playing back and seeking a multimedia file.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of," when preceding a list of elements, modify the entire list of elements and do not modify the individual elements of the list.

FIG. 1 illustrates a system for playing back and seeking a multimedia file. The system shown in FIG. 1 includes a media service apparatus 110, a media playback apparatus 120, and a network 430 connecting the two apparatuses 110 and 120.

The media service apparatus 110 includes a computing or processing device suitable for providing computing services to one or more video playback apparatuses. For example, the media service apparatus 110 includes a device, such as a network camera, a network video recorder (NVR) and a digital video recorder (DVR), capable of generating or storing a video stream and transmitting the video stream to user devices. The media service apparatus 110 may be also referred to as a media service system, in which a server and a network camera are included.

The media playback apparatus 120 includes a computing or processing device suitable for interacting with the media service apparatus 110 or other computing user devices via the network 430. For example, the media playback apparatus 120 may include a desktop computer, a mobile phone or smart phone, a personal digital assistant (PDA), a laptop computer and a tablet computer.

The media data (e.g., video) captured or stored in real time by the media service apparatus 110 is transmitted through the network 430 at the request of the media playback apparatus 120. The user may play back or seek the media data transmitted through a user interface implemented on a web browser 210 of the media playback apparatus 120. In particular, the web browser 210 may include a commonly known browser such as Google Chrome, Microsoft Explorer, Mozilla Firefox and Apple Safari installed on a desktop computer or mobile phone, and may also include software applications that are created separately using application programing interfaces (APIs) or resources of the web browser.

Hereinafter, real time streaming protocol (RTSP) and/or real-time transport protocol (RTP) streams that are transmitted through a WebSocket protocol will be described with reference to FIG. 2 to FIG. 5. The WebSocket may be used as a network communication scheme between the media service apparatus 110 and the media playback apparatus 120.

Figure 2:
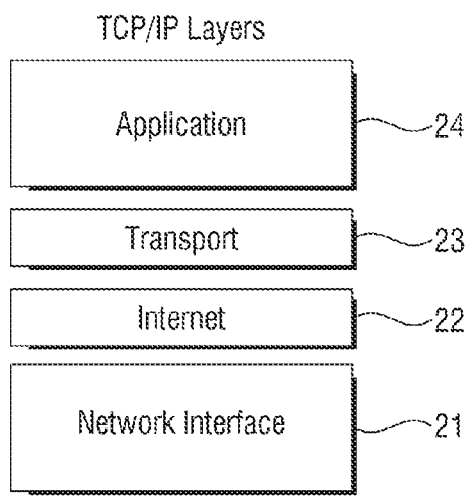
FIG. 2 is a diagram illustrating a Transmission Control Protocol/Internet Protocol (TCP/IP) 4-layer model that is hierarchically defined for communication between devices.

FIG. 2 is a diagram illustrating a transmission control protocol/internet protocol (TCP/IP) 4-layer model that is hierarchically defined for communication between devices. The four layers include a network interface layer 21, an Internet layer 22, a transport layer 23 and an application layer 24. Since the WebSocket enables transmission of messages on top of the transport layer 23, in order to use the WebSocket connection, a TCP transport connection may have to be first established between the media service apparatus 110 and the media playback apparatus 120. Once the WebSocket connection is established between the media service apparatus 110 and the media playback apparatus 120, for example, via a 3-way handshake process, the WebSocket communication is performed by transmitting WebSocket packets. The WebSocket connection and the WebSocket packet will be described in detail with reference to FIGS. 3 to 5 below.

Figure 3:
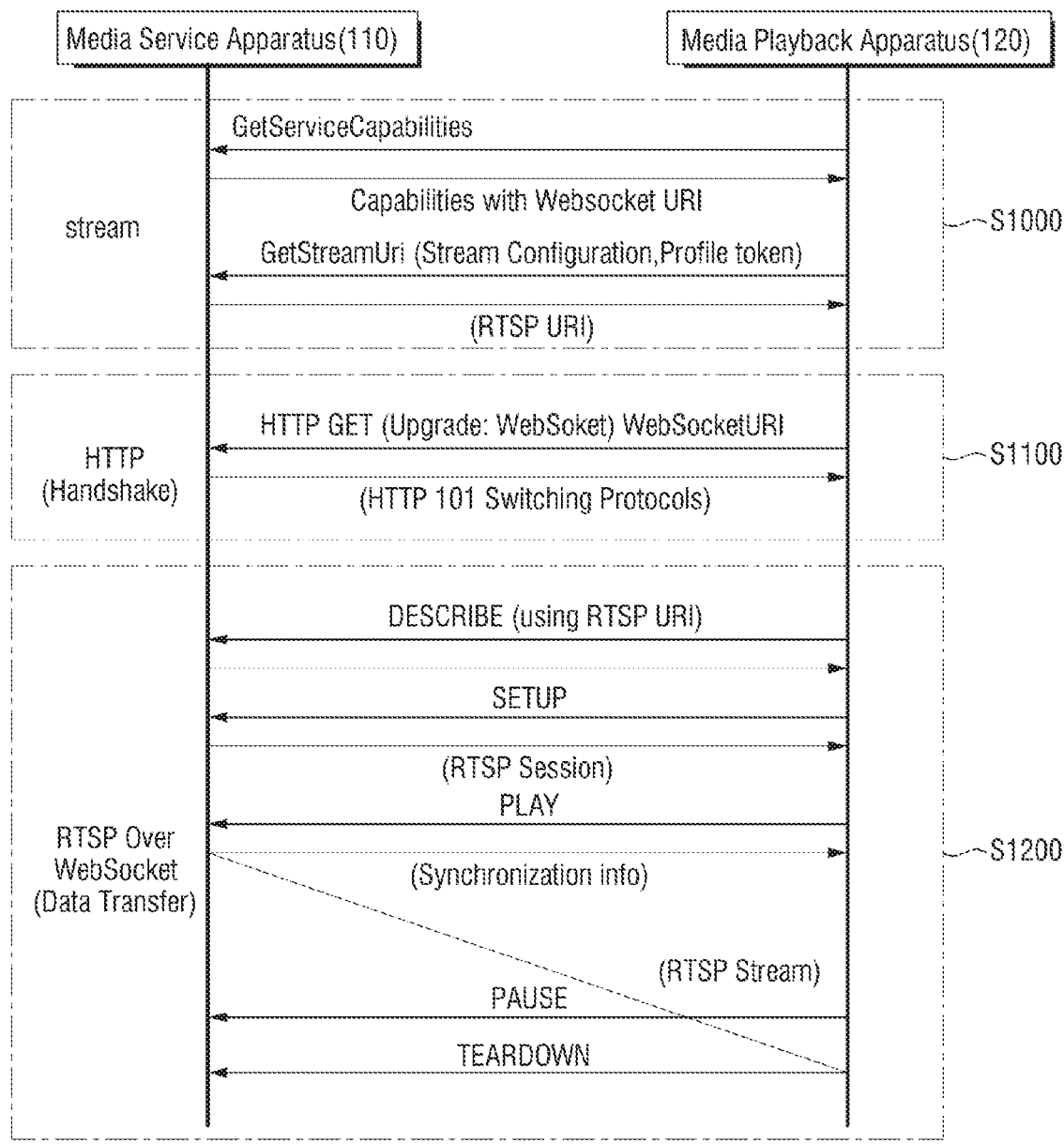
FIG. 3 shows a process of performing a WebSocket connection between a media service apparatus and a media playback apparatus.

FIG. 3 shows a process of performing a WebSocket connection between the media service apparatus 110 and the media playback apparatus 120. The media playback apparatus 120 requests the media service apparatus 110 to initiate a WebSocket connection using a WebSocket uniform resource identifier (URI). The WebSocket URI may be obtained using a command of GetServiceCapabilities. The WebSocket URI is expressed, for example, as "ws:// 192.168.0.5/webSocketServer" (operation S1000).

The media playback apparatus 120 may transmit a WebSocket upgrade request to the media service apparatus 110. The media service apparatus 120 may respond with code 101, which is a status code to approve a protocol change request (operation S1100).

After the WebSocket connection is established between the media service apparatus 110 and the media playback apparatus 120, data is exchanged through the RTSP/RTP protocol transmitted over a WebSocket instead of a hypertext transfer protocol (HTTP)/1.1 protocol. DESCRIBE, SETUP, PLAY, PAUSE and TEARDOWN in FIG. 3 are RTSP commands. A DESCRIBE request includes a uniform resource locator (URL). A response message to DESCRIBE also includes a description of the request. A SETUP request specifies whether a single media stream should be transmitted. A PLAY request is a request to play one or all media streams, and multiple requests are possible. A PAUSE request is a command to pause the playback of one or all media streams. The playback may be restarted in response to a PLAY request. A TEARDOWN request is a command to terminate a session. The playback of all the media streams may be stopped by the TEARDOWN request and all sessions related to the data are also released (operation S1200).

An example of a request message sent from the media playback apparatus 120 and a response message of the media service apparatus 110 in the WebSocket connection process shown in FIG. 3 is provided in Table 1 as follows.

TABLE 1

| Media Playback Apparatus 120 -> Media Service Apparatus 110 |
| --- |
| GET /webSocketServer HTTP/1.1<br>Host: 192.168.0.1<br>Upgrade: websocket<br>Connection: Upgrade<br>Sec-WebSocket-Key: dGhlIHNhbXBsZSBub25jZQ==<br>Origin: http://example.com<br>Sec-WebSocket-Protocol: rtsp.onvif.org<br>Sec-WebSocket-Version: 13. |
| Media Service Apparatus 110 -> Media Playback Apparatus 120 |
| HTTP/1.1 101 Switching Protocols<br>Upgrade: websocket<br>Connection: Upgrade<br>Sec-WebSocket-Accept: s3pPLMBiTxaQ9kYGzzhZRbK+xOo=<br>Sec-WebSocket-Protocol: rtsp.onvif.org |

This WebSocket connection is made according to a WebSocket protocol that follows the HTML5 standard. In particular, since the WebSocket connection continuously supports bidirectional communication, data can be continuously transmitted and received between the media service apparatus 110 and the media playback apparatus 120 without being disconnected.

Figure 4:
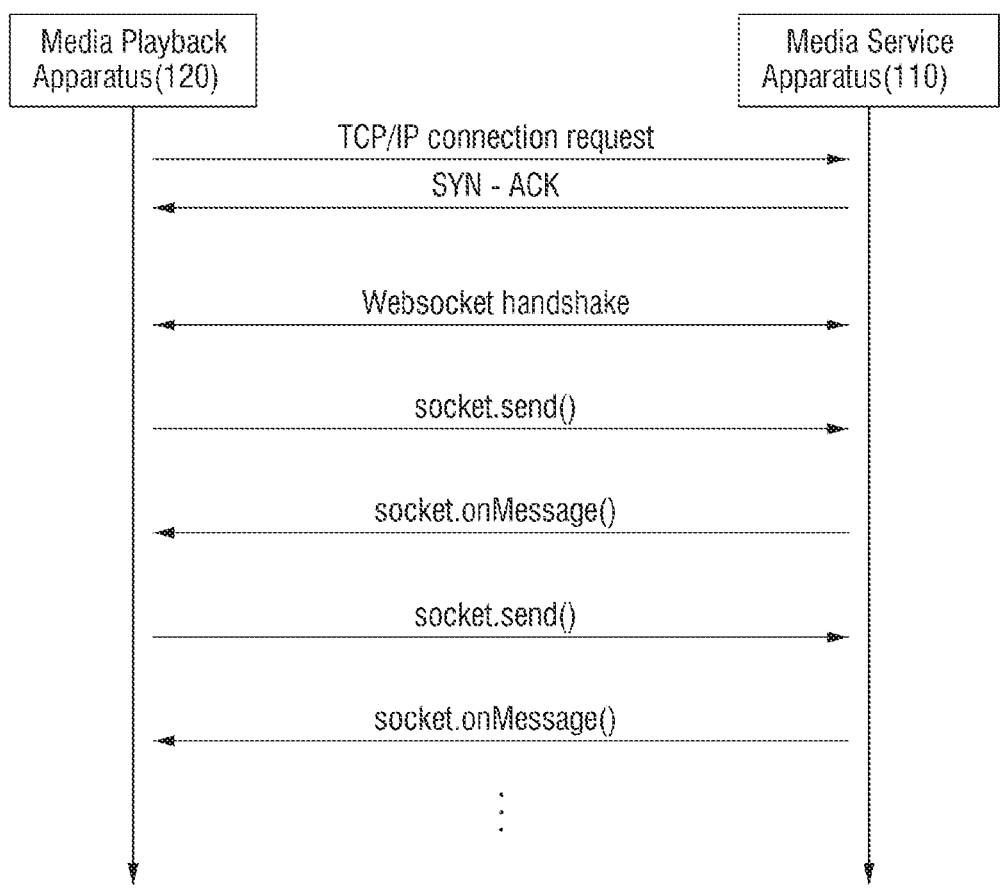
FIG. 4 shows an example of a process of transmitting and receiving data through a WebSocket connection.

FIG. 4 shows an example of a process of transmitting and receiving data through a WebSocket connection. Referring to FIG. 4, first, the media playback apparatus 120 transmits a TCP/IP connection request message to the media service apparatus 110, and the media service apparatus 110 accepts it and transmits a TCP response message (SYN-ACK) to the media playback apparatus 120, thereby establishing a TCP/IP connection. A TCP transport connection may be formed by a pair of a local TCP socket and a remote TCP socket. Each TCP socket is defined by at least an identifier such as a port number and an IP address. A user diagram protocol (UDP)/IP-based connection may be established between the media playback apparatus 120 and the media service apparatus 110 instead of the TCP/IP-based connection.

Then, when the WebSocket connection is established through a handshake process between the media playback apparatus 120 and the media service apparatus 110, continuous data transmission/reception between them can be performed thereafter. That is, the media playback apparatus 120 transmits a media streaming request to the media service apparatus 110 in the form of a transmission WebSocket packet (socket.send), and the media service apparatus 110 transmits a media stream to the media playback apparatus 120 in the form of a response WebSocket packet (socket.onMessage). This process can be performed continuously between the media playback apparatus 120 and the media service apparatus 110 until media stream transmission is stopped or completed.

Figure 5:
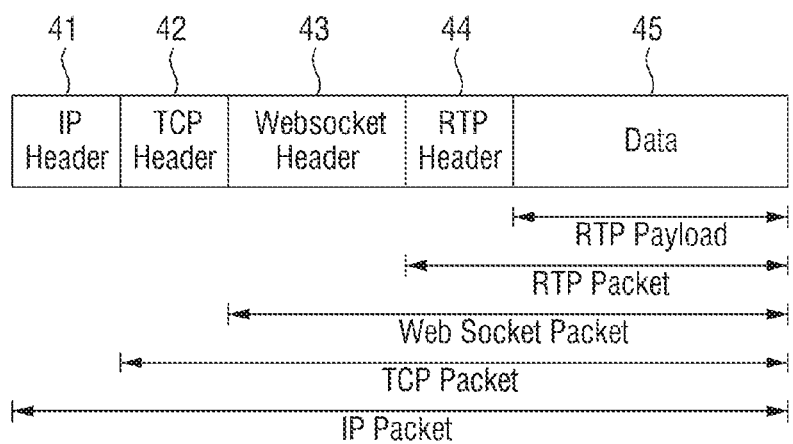
FIG. 5 is a diagram illustrating a structure of a communication packet transmitted through a network interface.

FIG. 5 is a diagram illustrating a structure of a communication packet transmitted through the network interface 21. When an RTP header 44 is added to an RTP payload corresponding to data 45, the RTP payload becomes an RTP packet. The RTP packet is equal to a WebSocket payload, and a WebSocket header 43 may be added to the RTP packet to become a WebSocket packet. The WebSocket packet may be equal to a TCP payload, and a TCP header 42 may be added to the WebSocket packet to become a TCP packet. Finally, the TCP packet may be equal to an IP payload, and an IP header 41 is added to the TCP packet, thereby completing a communication packet, that is, an IP packet. The process of completing the IP packet and a process of removing each header are performed in both the media service apparatus 110 and the media playback apparatus 120.

Since the communication between the media service apparatus 110 and the media playback apparatus 120 is performed through a HTML5-based WebSocket protocol, a module that performs RTSP/RTP transmission/reception control and a decoder can be implemented by script code that can be parsed in HTML5. Accordingly, media playback using the RTSP/RTP protocol may be implemented in a web browser of the HTML5 environment without separately installing a plug-in as in a conventional case.

The network communication scheme between the media service apparatus 110 and the media playback apparatus 120 has been described so far. Hereinafter, a configuration and operation method of the media service apparatus 110 and the media playback apparatus 120 will be described with reference to FIGS. 6 to 16.

Prior to the description, the terms used for playing back and seeking media are defined. Playback commands include Play, Stop, Pause, Rewind and Fast Forward, which are operation methods of media displayed on a web browser as commands inputted by the user. Seek commands include Skip Seek, Forward Seek and Backward Seek used for seeking a frame displayed on a web browser as commands inputted by the user, similarly to playback commands. Skip Seek refers to moving to an arbitrary frame for seeking, Forward Seek refers to seeking in a forward direction of the currently displayed frame, and Backward Seek refers to seeking in a backward direction of the currently displayed frame.

Figure 6:
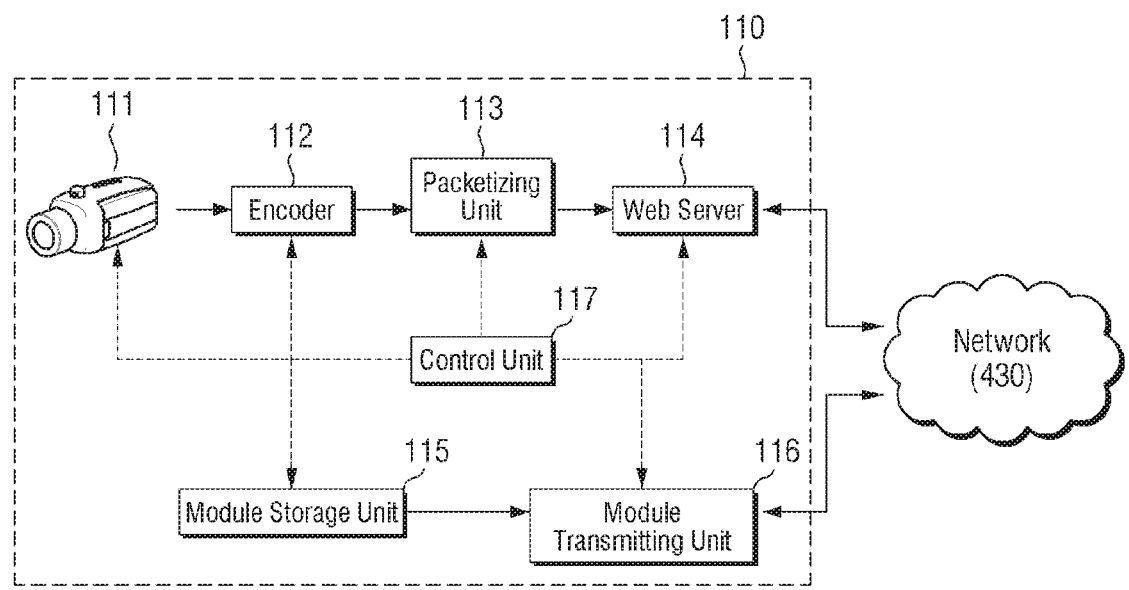
FIG. 6 shows a configuration of the media service apparatus according to an exemplary embodiment.

FIG. 6 shows a configuration of the media service apparatus 110 according to an exemplary embodiment. In one exemplary embodiment, the media service apparatus 110 includes a real-time video camera 111, an encoder 112, a packetizing unit 113, a web server 114, a module storage unit 115, a module transmitting unit 116, and a control unit 117. The encoder 112, the packetizing unit 113, and the control unit 117 may be included in one or more processors.

The real-time video camera 111 is a means may capture images in real time, and the capturing includes a case of performing both video capturing and audio recording and a case of performing only video capturing.

The encoder 112 is configured to compress and encode the media captured by the real-time video camera 111. The encoding of the encoder 112 is not necessarily performed using a specific codec supported by a decoder embedded in the web browser, but may be performed in an arbitrary codec format.

The packetizing unit 113 packetizes the encoded media data to generate a transmission packet. The packetization may be performed by dividing the media data into appropriate lengths to facilitate transmission via the network 430 or, collectively assigning control information, such as a receiving address, to each data in an appropriate length if the media data is short. In this case, the control information is located in the header of the packet. The transmission packet is in the form of the above-described WebSocket packet.

The packetizing unit 113 may perform packetization of the media data according to a method requested by the media playback apparatus 120. When the media playback apparatus 120 requests the media according to an input seek command, the packetizing unit 113 generates a transmission packet on a frame-by-frame basis of the media data. When the media playback apparatus 120 requests the media according to an input playback command, the packetizing unit 113 generates a transmission packet in a format of a container which is chunk data including a plurality of frames. This allows the media playback apparatus 120 to perform decoding on a frame-by-frame basis to perform media seeking on a frame-by-frame basis in accordance with a seek command. Also, this makes it possible to configure a container format supported by a decoder embedded in the web browser of the media playback apparatus 120 in the case of a playback command. For example, this is a case where media data is configured in an MPEG-DASH container format supported by a video tag in order to use a video tag as a decoder embedded in a web browser.

The web server 114 establishes a communication session with the media playback apparatus 120. For example, a WebSocket connection may be established between the web server 114 of the media service apparatus 110 and the media playback apparatus 120 through a handshake process between them. Thereafter, according to the request of the media playback apparatus 120, the transmission packet generated by the packetizing unit 113 is transmitted through the web server 114.

The module storage unit 115 may store a script module necessary to play back and seek media in the media playback apparatus 120. The script module is a module, which allows the media playback apparatus 120 to play back and seek media in a web browser in an HTML5 environment without installing a plug-in or a separate application program, as code written in a script that can be parsed by a web browser. The script module may be code written in JavaScript in one embodiment. The script module will be described later with reference to FIGS. 8 and 9.

The module transmitting unit 116 may transmit the script module stored in the module storage unit 115 to the media playback apparatus 120. The module transmitting unit 116 transmits the script module in response to a connection being established between the media playback apparatus 120 and the media service apparatus 110 via the network 430.

The control unit 117 may control other configuration modules in the media service apparatus 110. For example, when the media playback apparatus 120 connects to the web server 114 through the network 430, the script module stored in the module storage unit 115 is transmitted to the media playback apparatus 120 through the module transmitting unit 116. In this case, the control unit 117 ends/receives signals to/from the respective modules to control the operation to be performed smoothly.

Figure 7:
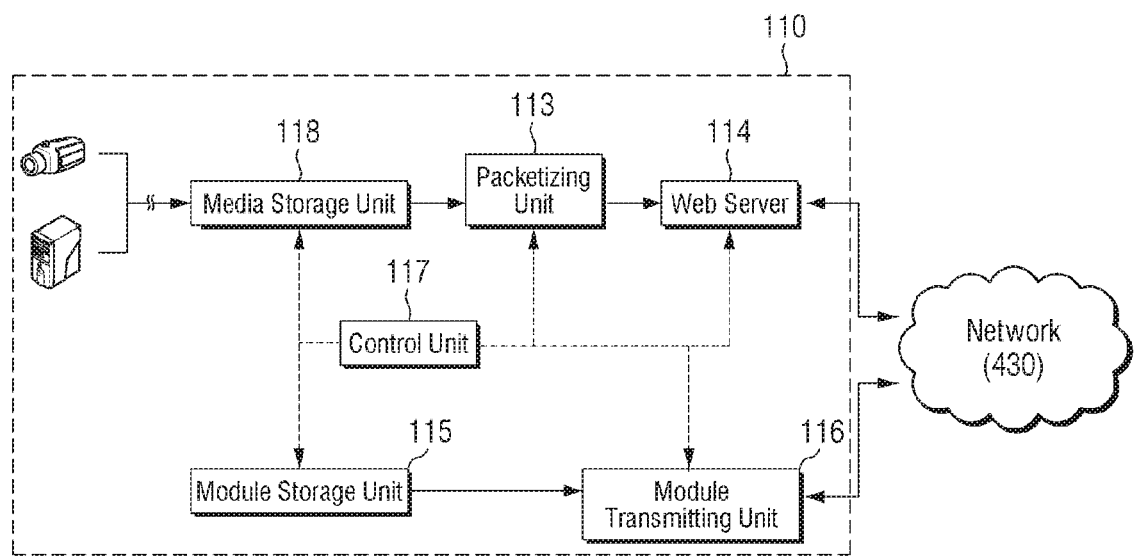
FIG. 7 shows a configuration of the media service apparatus according to another exemplary embodiment.

FIG. 7 shows a configuration of the media service apparatus 110 according to another exemplary embodiment. The media service apparatus 110 of FIG. 6 represents an embodiment for transmitting real-time live media using the real-time video camera 111, and the media service apparatus 110 of FIG. 7 represents an embodiment for transmitting media stored in a media storage unit 118.

The media storage unit 118 includes a network video recorder (NVR) or a personal video recorder (PVR). However, FIG. 7 will be described in conjunction with the network video recorder. The media storage unit 118 receives media data from a camera or a server and compresses and stores the received media data. When there is a request for transmission of the stored media data from the media playback apparatus 120, the media service apparatus 110 packetizes the media data stored in the media storage unit 118 in the packetizing unit 113 and transmits the packetized data through the web server 114. The packetizing unit 113, the web server 114, the module storage unit 115, the module transmitting unit 116 and the control unit 117 among the configuration modules of the media service apparatus 110 have been described with reference to FIG. 6, and thus, a redundant description thereof will be omitted.

Figure 8:
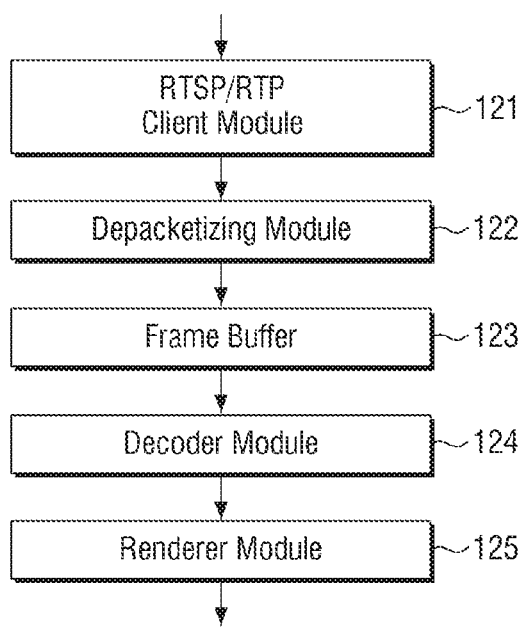
FIG. 8 shows a script module of a module storage unit according to an exemplary embodiment.

FIG. 8 shows a script module of the module storage unit 115 according to an exemplary embodiment. FIG. 8 is an example of a script module for seeking media, which includes a RTSP/RTP client module 121, a depacketizing module 122, a frame buffer 123, a decoder module 124, and a renderer module 125. In the embodiment of FIG. 8, the script module is implemented in JavaScript which is a script that can be parsed by a web browser.

The RTSP/RTP client module 121 is configured to support RTSP/RTP communication with the media service apparatus 110. In related art, it may not be able to process media data according to the RTSP/RTP protocol on a web browser without a plug-in. According to the present exemplary embodiment, the RTSP/RTP client module 121 may allow to reliably receive data transmitted through the RTSP/RTP protocol even if the web browser uses a HTTP scheme.

The depacketizing module 122 may depacketize a packet transmitted from the RTSP/RTP client module 121. The depacketization is an opposite operation of packetization. If the packetization is performed by dividing media data into pieces having appropriate lengths to form packets, the depacketization may be performed by restoring the media data to a state prior to the packetization by putting the pieces (i.e., packets) together again.

The frame buffer 123 may temporarily store depacketized frames. The frame buffer 123 may temporarily store adjacent frames at forward and backward positions with respect to the currently displayed frame, and a detailed description thereof will be given later with reference to FIG. 12.

The decoder module 124 may decompress the encoded media data, i.e., performing decoding. The decoder module 124 is implemented in JavaScript similarly to other modules of the script module. Since the decoder module 124 is implemented in JavaScript, unlike the decoder embedded in the web browser, it is possible to perform decoding in an arbitrary codec format without limitation to the codec format. It is also possible to perform decoding on a frame-by-frame basis.

If the decoder module 124 is implemented in JavaScript according to the embodiment of FIG. 8, the decoder module 124 may be represented by the code shown in the following Table 2, for example.

TABLE 2

```
function HevcDecoder ( ) {
  var _name = "HevcDecoder";
  var self = this;
  this._decoderParameters = null;
```

TABLE 2-continued

```
  this._isRequestActive = false;
  this._player = null;
  this._requestContext = null;
  this._requestContextQueue = [ ];
  this.pushRequestContext = function (requestContext) {
    self._requestContextQueue.push(requestContext);
  };
  this.decode = function ( ) {
    if (self._isRequestActive) {
        return;
    }
    if (self._requestContextQueue.length) {
        self._isRequestActive = true;
        self._requestContext = self._requestContextQueue.pop( );
        self._playStream(self._requestContext.stream);
    }
  };
  this._createDecodeCanvas = function(parentElement) {
    self.canvas = document.createElement("canvas");
    self.canvas.style.display = "none";
    self.canvas.id = "decode-canvas";
    parentElement.appendChild(self.canvas);
    self.ctx = self.canvas.getContext("2d");
  };
  this._playStream = function (buffer) {
    this._reset( );
    this._handleOnLoad(buffer);
  }
  this._onImageDecoded = function (image) {
    var width = image.get_width( );
    var height = image.get_height( );
    this.canvas.width = width;
    this.canvas.height = height;
    this._imageData = this.ctx.createImageData(width, height);
    image.display(this._imageData, function (displayImageData) {
        var itemId =
self._requestContext.itemIds[self._requestContext.currentFrameIndex];
        var payload = self._requestContext.payload;
        if (height > payload.displayHeight) {
          payload.displayHeight = height;
        }
        if (!(itemId in self._requestContext.dependencies)) {
          if (width > payload.displayWidth) {
            payload.displayWidth = width;
          }
          payload.frames.push({
            canvasFrameData: displayImageData.data,
            itemId: itemId,
            width: width,
            height: height
          });
        }
        self._requestContext.currentFrameIndex++;
        if (self._requestContext.currentFrameIndex > =
self._requestContext.itemIds.length) {
            self._requestContext.callback(payload);
            self._isRequestActive = false;
            self.decode( ); // Decode next queued request
        }
    });
  };
  .
  .
  .
```

The renderer module 125 functions to render the decoded media data and display it on an output device such as a monitor or the like. The renderer module 125 converts video data in a YUV format into video data in a RGB format using WebGL. WebGL is a web-based graphical library that is available through JavaScript and allows the creation of a three-dimensional (3D) graphical interface.

Figure 9:
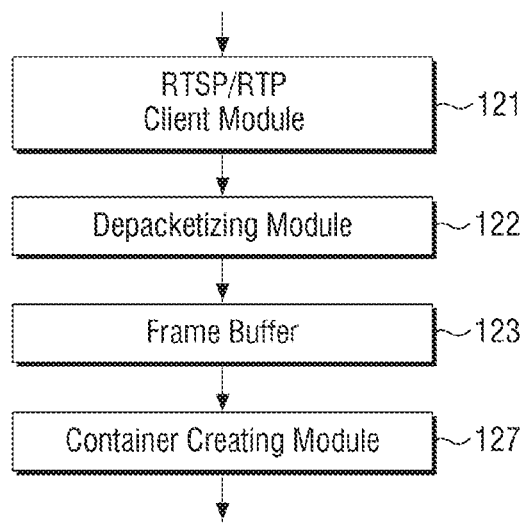
FIG. 9 shows a script module of the module storage unit according to another exemplary embodiment.

FIG. 9 shows another embodiment of the script module of the module storage unit 115. FIG. 9 is an example of a script module for playing media back. The script module includes the RTSP/RTP client module 121, the depacketizing module 122, the frame buffer 123 and a container creating module 127. Further, in the embodiment of FIG. 9, the script module is implemented in JavaScript. The RTSP/RTP client module 121, the depacketizing module 122 and the frame buffer 123 are the modules described with reference to FIG. 8.

Referring to FIG. 9 in more detail, it can be seen that the script module of FIG. 9 includes the container creating module 127 implemented in JavaScript unlike the case of FIG. 8. The container creating module 127 is configured to form chunk data by collecting frames when the media data is not packaged on a container basis.

Chunk data refers to a container supported by a video tag such as an MPEG-DASH container. Since the container creating module 127 forms the media data in a container format compatible with the video tag, it is possible to use the video tag without a compatibility problem even if a media capturing device does not transmit the media data in the container format. That is, it provides an environment in which a video tag can be used without modification of an image capturing device installed previously.

The script module described with reference to FIGS. 8 and 9 is transmitted from the media service apparatus 110 to the media playback apparatus 120 as the media playback apparatus 120 connects to the media service apparatus 110, and provides an environment in which an operation of playing back and seeking media can be performed in the web browser 210 of the media playback apparatus 120 without a plug-in. That is, the script module is installed in the media playback apparatus 120 to configure a system for playing back and seeking media. An embodiment of the media playback apparatus 120 having the script module will be described with reference to FIGS. 10 and 11.

Figure 10:
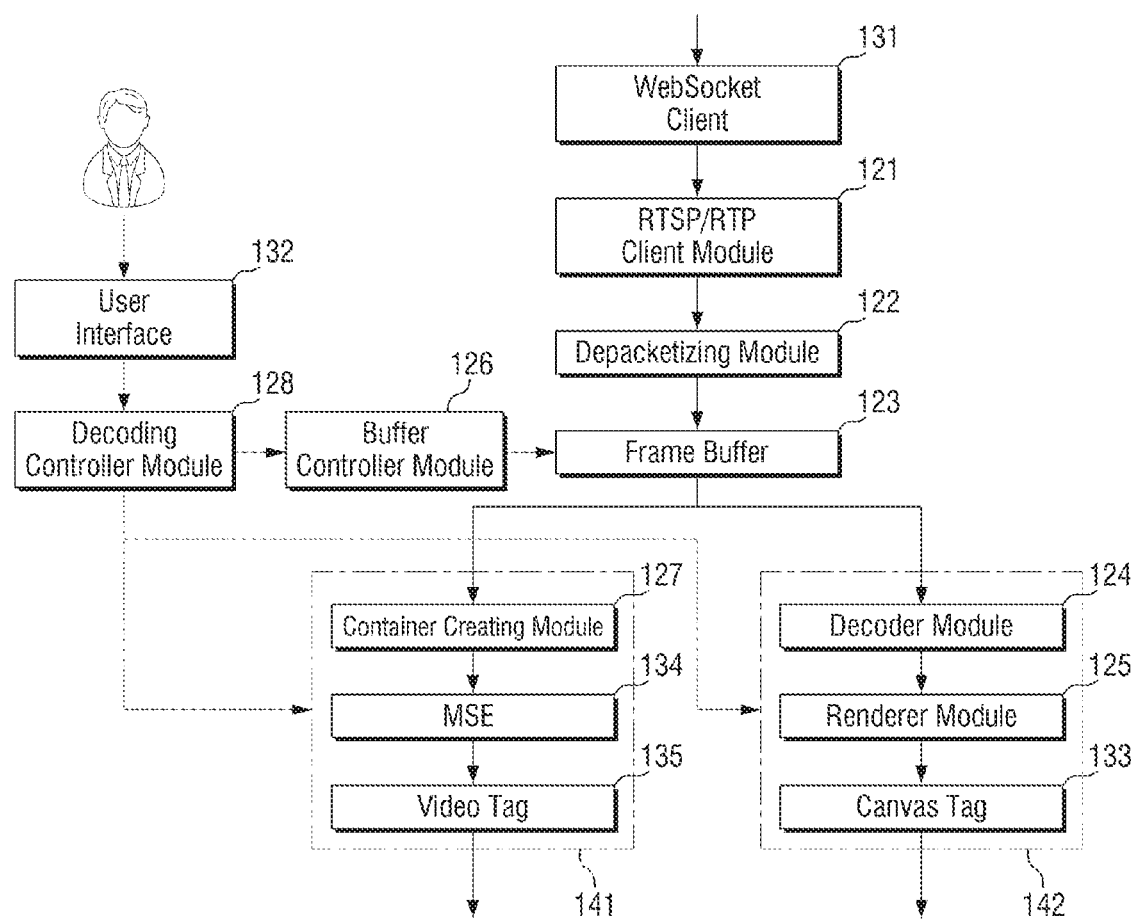
FIG. 10 shows the media playback apparatus according to an exemplary embodiment.

FIG. 10 shows an embodiment of the media playback apparatus 120. The embodiment of FIG. 10 represents the media playback apparatus 120 for playing back and seeking media when media data is received in a frame-by-frame format.

The media playback apparatus 120 includes a WebSocket client 131 and the RTSP/RTP client module 121 constituting a receiving unit, the depacketizing module 122, the frame buffer 123, a first media restoring unit 141, a second media restoring unit 142, a buffer controller module 126, a decoding controller module 128, and a user interface 132. In this case, the RTSP/RTP client module 121, the depacketizing module 122, the frame buffer 123, the container creating module 127 of the first media restoring unit 141, the decoder module 124 of the second media restoring unit 142, the renderer module 125, the buffer controller module 126 and the decoding controller module 128 are modules that are configured by receiving a script module in response to a case where the media playback apparatus 120 connects to the media service apparatus 110 through the network 430. In the embodiment of FIG. 10, the media playback apparatus 120 includes two video decoders, i.e., a first video decoder and a second video decoder which are included in the first media restoring unit 141 and the second media restoring unit 142, respectively.

The WebSocket client 131 and the RTSP/RTP client module 121 constitute a receiving unit. The WebSocket client 131 is a module for establishing a WebSocket connection with the web server 114 of the media service apparatus 110. The media playback apparatus 120 and the media service apparatus 110 send and receive a transmission packet through a handshake between the WebSocket client 131 and the web server 114, respectively.

The RTSP/RTP client module 121 performs a function of supporting RTSP/RTP communication in the user's web browser 210 as described in the embodiment of FIG. 8. Accordingly, the user can play back media through the web browser 210 of the HTML5 environment using the RTSP/RTP protocol without installing a separate plug-in.

The transmission packet having passed through the WebSocket client 131 and the RTSP/RTP client module 121 is depacketized in the depacketizing module 122 and then delivered to the frame buffer 123.

Figure 12:
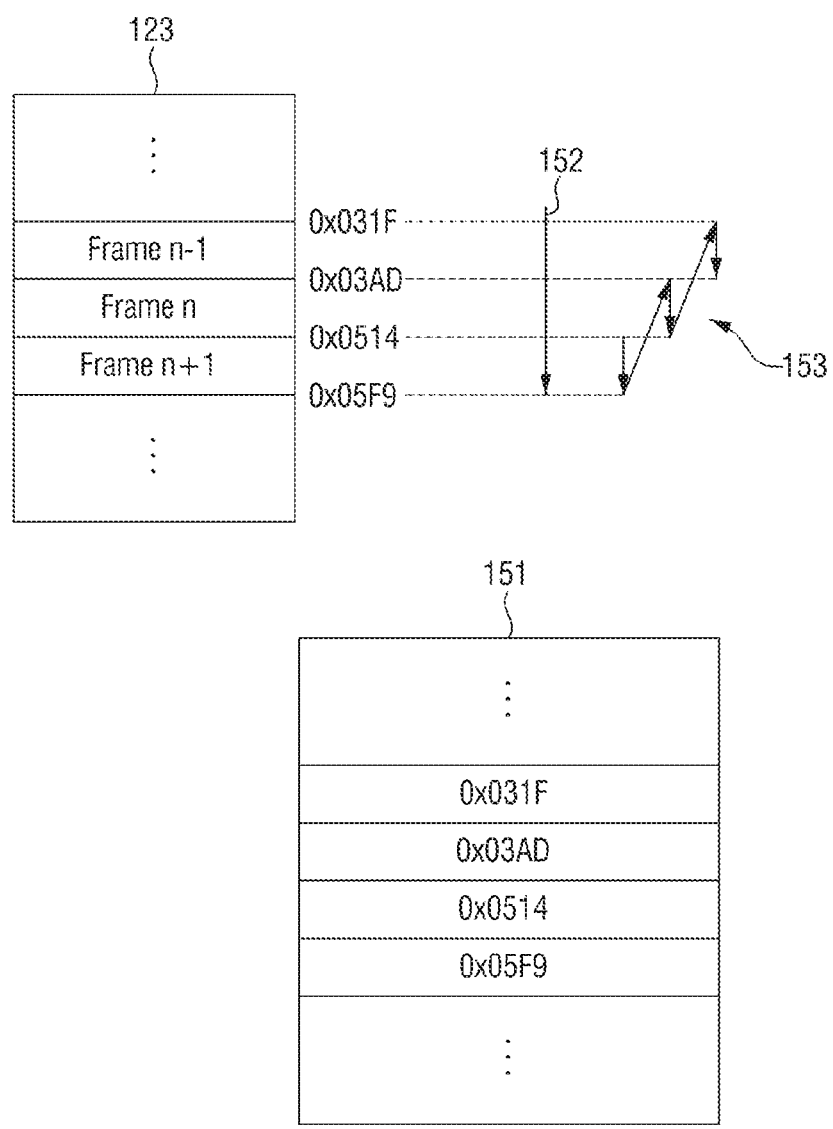
FIG. 12 shows a frame buffer and a buffer list according to an exemplary embodiment.

The frame buffer 123 and the buffer controller module 126 will be described with reference to FIG. 12. FIG. 12 shows an embodiment of the frame buffer 123 and a buffer list 151. The frame buffer 123 is a module for temporarily storing depacketized frames, and the buffer list 151 is a module including identifiers of frames temporarily stored in the frame buffer 123. In one embodiment, the identifier is a memory address of the frame buffer 123 where the frame is stored.

Referring to FIG. 12, a frame n−1, a frame n, and a frame n+1 sequentially constitute the frames, and the memory addresses of the respective frames are 0x031F, 0x03AD and 0x0514. The frame n is a frame corresponding to a point at which playback is stopped or a point moved by a seek command, the frame n+1 is the nearest frame in a forward direction, and the frame n−1 is the nearest frame in a backward direction.

The frame buffer 123 buffers the frame n and adjacent frames in the forward and backward directions with respect to the frame n. In this case, the number of adjacent frames to be buffered in the forward direction may be equal to the number of adjacent frames to be buffered in the backward direction.

The buffer list 151 temporarily stores all identifiers of frames temporarily stored in the frame buffer 123 in the form of a list. FIG. 12 shows that the identifiers 0x031F, 0x03AD and 0x0514 of the frame n−1, the frame n and the frame n+1 are stored in the list form in the buffer list 151.

The buffer controller module 126 includes the buffer list 151 as a module for controlling the operation of the frame buffer 123 according to a playback command or a seek command. When the user sends a command of seek 152 in the forward direction with respect to the currently displayed frame n, the buffer controller module 126 seeks the frame n+1, which is the nearest frame in the forward direction of the frame n through a pointer, referring to the next identifier 0x0514 of the identifier of the frame n in the buffer list 151. Similarly, when seek 153 in the backward direction with respect to the frame n is inputted, the buffer controller module 126 seeks the frame n−1 through the pointer, referring to the previous identifier 0x031F of the identifier of the frame n in the buffer list 151.

When the seeking of media data is performed up to the final identifier included in the buffer list 151 or the skip seek is performed for any frame not included in the frame buffer 123 by the user, a process of buffering adjacent frames in the frame buffer 123 with respect to a frame corresponding to the final identifier or an arbitrary frame may be resumed to perform smooth seeking.

If the frame buffer 123 is set to selectively buffer an I frame (intra frame), the user can perform forward seeking and backward seeking for the I frame among the frames.

A conventional buffer for media playback uses a method of performing buffering again if the seeking direction is changed to the backward direction in order to temporarily store a certain amount of adjacent frames in the forward direction after the current playback time. However, since the frame buffer 123 of the present disclosure temporarily stores adjacent frames in the forward and backward directions at the current playback time, no additional buffering is required when the user performs seeking in the direction opposite to the playback direction.

When the media is played according to the playback command, the frame buffer 123 may serve as a jitter buffer. Therefore, smooth audio playback is possible by eliminating jitter due to a transmission delay of audio traffic.

Referring again to FIG. 10, the media to be played back or sought is transmitted from the frame buffer 123 to the first media restoring unit 141 or the second media restoring unit 142.

The first media restoring unit 141 includes, as a module for playing back media, the container creating module 127, a mean squared error (MSE) module 134 and a video tag module 135. The video tag module 135, which is a first video decoder, decodes the data. The video tag module 135 may also be referred to as a video tag player.

As described with reference to FIG. 9, when the media data is not transmitted in a container format, the container creating module 127 collects frames to generate chunk data in a container format. The media data having passed through the container creating module 127 is delivered to the MSE module 134 and the video tag module 135 without a compatibility problem due to the container format.

The MSE module 134 is a JavaScript API for HTML5, which is created for video streaming playback using HTTP download. This technology, standardized by the World Wide Web Consortium (W3C), enables streaming playback on a game console such as Xbox and PlayStation 4 (PS4) or Chromecast browser.

The video tag module 135 performs decoding and rendering so that media is displayed on a web browser. Using the decoder of the video tag module 135 enables decoding with better performance than the decoder module 124 which has a limitation due to the dynamic language characteristic of JavaScript. In other words, high resolution images and decoding of high frames per second (FPS) can be achieved.

The second media restoring unit includes, as a module for seeking media, the decoder module 124, the renderer module 125 and a canvas tag 133, and the media data is decoded through the decoder module 124 implemented with JavaScript, which is the second video decoder.

The decoding in the decoder module 124 is performed on a frame-by-frame basis. Due to a frame-by-frame processing method of the decoder module 124, the user can seek the media on a frame-by-frame basis.

The decoded media data is displayed on the web browser via the renderer module 125 and the canvas tag 133. The canvas tag 133 is an element of HTML5 that allows 2D shapes and bitmap images to be dynamically rendered. That is, it can be regarded as a paint program on the web browser. Since it is a function supported by most of the latest versions of web browsers, the media data may be processed on a frame-by-frame basis by the decoder implemented in JavaScript and displayed on the web browser by using the canvas tag 240.

The decoder controller module 128 may control the media data to be decoded by the first media restoring unit or the second media restoring unit according to the user's input. If the user's input is a playback command, the frame buffer 123 transmits the media data to the first media restoring unit 141 through the buffer controller module 126, and the media data is decoded in the first media restoring unit 141 and is displayed on the web browser 210. If the user's input is a seek command, the frame buffer 123 transmits the media data to the second media restoring unit 142 through the buffer controller module 126, and the media data is decoded on a frame-by-frame basis in the second media restoring unit 142 and is displayed on the web browser 210.

The decoding controller module 128 may be configured as an execution instruction of hardware such as a CPU, but may also be implemented as a subroutine in software such as C language, C++, or JavaScript.

When a seek command is inputted while executing a playback command, the decoder controller module 128 stops decoding of the first media restoring unit 141, and transmits the media data to the second media decompression unit 142 such that the media data is decoded by the decoder module 124 implemented in JavaScript. When a playback command is inputted while executing a seek command, the decoding controller module 128 stops decoding of the second media restoring unit 142, and transmits the media data to the first media restoring unit 141 such that decoding is performed by the video tag module 135.

The user interface 132, which is a final configuration module of the media playback apparatus 120 in the embodiment of FIG. 10, is described with reference to FIG. 13.

Figure 13:
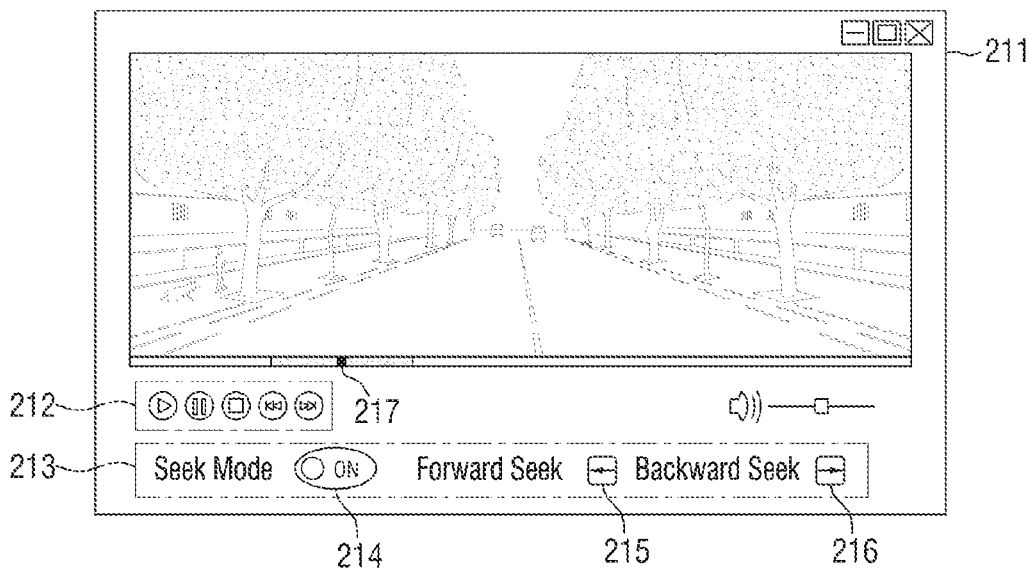
FIG. 13 illustrates a graphic user interface (GUI) included in a user interface according to an exemplary embodiment.

FIG. 13 illustrates a GUI 211 included in the user interface 132 according to an exemplary embodiment. The user interface 132 includes the GUI 211 and an input device. The GUI 211 implemented on the web browser 210 is shown in FIG. 13.

If the input device of the user interface 132 is a touch screen, the user may operate the system by touching the screen on which the GUI 211 is displayed. If the input device is a mouse, the user may operate the system by clicking or dragging each button of the GUI 211.

The GUI 211 includes a playback command input unit 212 and a seek command input unit 213. The user may input a playback command such as Playback, Pause and Stop through the playback command input unit 212. The user may input a seek command such as ON/OFF of a seek mode, Forward Seek and Backward Seek by using the seek command input unit 213.

When the user sets a toggle button 214 to ON, the seek mode is started. Shaded bars on both sides of a pointer 217 indicating the current playback position indicate that the video frame currently displayed in the frame buffer 123 and adjacent frames in the forward and backward directions are temporarily stored. When the user clicks a forward seek button 215, forward seek is performed to seek an adjacent frame in the forward direction of the currently displayed frame. When the user clicks a backward seek button 216, backward seek is performed to seek an adjacent frame in the backward direction of the currently displayed frame. Further, the user may skip one or more frames by dragging the pointer 217 to a certain frame. In the above description of FIG. 13, it has been explained that the mode is switched to the seek mode when the user sets the seek mode to ON. However, the present exemplary embodiment is not limited thereto, and may be configured such that the mode is automatically switched to the seek mode at the time of occurrence of a specific event such as appearance of a designated object, generation of audio over a certain level, scene change, or the like.

Figure 14:
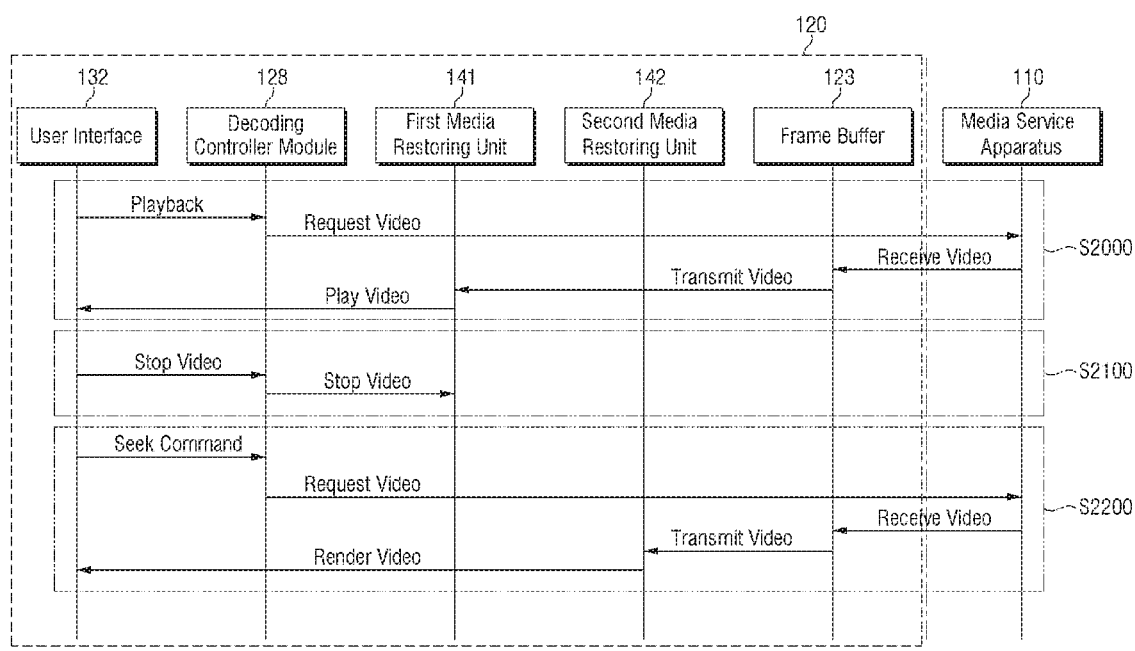
FIG. 14 shows an operation process of the media playback apparatus according to a user's input.

An operation process of the media playback apparatus 120 according to a user's input will be described with reference to FIG. 14.

When Play among the playback commands is inputted through the user interface 132, the decoding controller module 128 instructs the WebSocket client 131 to request media data.

The decoding controller module 128 does not necessarily have to instruct the web socket client 131 to request media data. Instead, the decoding controller module 128 may directly form a separate communication channel to request media data. That is, it may be set differently depending on the system configuration. In the embodiment of FIG. 14, the decoding controller module 128 directly requests that the media service apparatus 110 transmit media data to the media playback apparatus 120.

The media data received from the media service apparatus 110 is temporarily stored in the frame buffer 123 and then delivered to the first media restoring unit 141. The media data is decoded in the video tag module 135 of the first media restoring unit, and displayed on the user interface 132 of the web browser 210 (operation S2000).

When a command such as Pause or Stop is inputted to the user interface 132, the decoding controller module 128 sends a command of stopping the media playback to the first media restoring unit 141, and the first media restoring unit 141 stops the media which is being played back (operation S2100).

When a seek command is inputted to the user interface 132, the WebSocket client 131 requests media data from the media service apparatus 110 by the command of the decoding controller module 128. In this case, the requested media data may be transmitted as a transmission packet generated in a frame-by-frame format. The received media data is temporarily stored in the frame buffer 123, and a seeking target frame is transmitted to the second media restoring unit 142. The media data is decoded on a frame-by-frame basis by the decoder module 124 implemented in JavaScript in the second media restoring unit 142, and displayed on the user interface 132 (operation S2200).

Next, another embodiment of the media playback apparatus 120 will be described with reference to FIG. 11. If the embodiment of FIG. 10 relates to the media playback apparatus 120 for playing back and seeking media data received in a frame-by-frame format, the embodiment of FIG. 11 represents the media playback apparatus 120 for playing back and seeking media data received in the form of chunk data including a plurality of frames.

Figure 11:
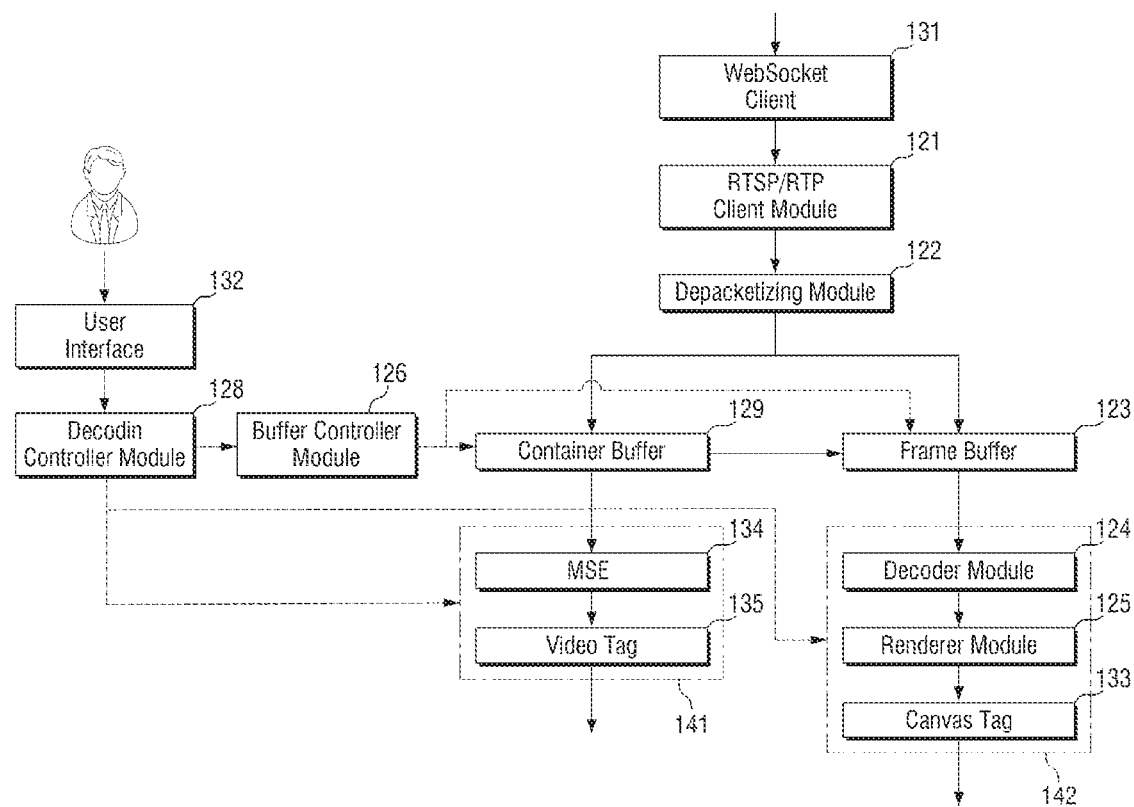
FIG. 11 shows the media playback apparatus according to another exemplary embodiment.

Unlike the embodiment of FIG. 10, the embodiment of FIG. 11 does not include the container creating module 127. Instead, a container buffer 129 serves to buffer chunk data, which is currently decoded and outputted, when media data is received in a container format, that is, on the basis of chunk data. When the received media data is already packaged in a container format in the media service apparatus 110 and transmitted, the chunk data is directly inputted to the MSE module 134 without passing through the container creating module 127 as shown in FIG. 10.

The chunk data buffered in the container buffer 129 may be inputted to the first media restoring unit 141 for playback, and may be buffered in the frame buffer 123 after being divided into frames for seeking. The frames buffered in the frame buffer 123 are decoded and rendered in the second media restoring unit 142 similarly to the embodiment of FIG. 10. In addition, the frames stored in the frame buffer 123 may be buffered bidirectionally in the step of being inputted to the second media restoring unit 142 such that bidirectional (backward/forward) seeking is easily performed by the user.

Hereinafter, a method of playing back and seeking chunk data received in a container format by the media playback apparatus 120 of FIG. 11 will be described.

The media data received through the receiving unit constituting the WebSocket client 131 and the RTSP/RTP client module 121 are depacketized in the depacketizing module 122 and transmitted to the container buffer 129.

When the user inputs a playback command of the media, the container buffer 129 transfers the media data to the first media restoring unit 141 such that the media data is restored through the MSE module 134 and the video tag module 135 and outputted.

When the user inputs a seek command of the media, the container buffer 129 transmits the chunk data to the frame buffer 123. An arrow connected from the container buffer 129 to the frame buffer 123 indicates the transmitted chunk data.

The frame buffer 123 converts the media data in a chunk data format into data in a frame-by-frame format and provides a seeking target frame to the second media restoring unit 142.

The second media restoring unit 142 decodes and renders a frame that is a target of the user's seek command through the decoder module 124 and the renderer module 125, and outputs the frame.

Control of buffering and media restoration according to the playback and seek commands of the user is performed by the decoding controller module 128 and the buffer controller module 126 in the same manner as in the embodiment of FIG. 10. In response to the playback command, the decoding controller module 128 controls the first media restoring unit 141 to restore and output the media data, and the buffer controller module 126 control the container buffer 129 to buffer the chunk data. In response to the seek command, the decoding controller module 128 controls the second media restoring unit 142 to restore and output the media data, and the buffer controller module 126 controls the chunk data to be transferred from the container buffer 129 to the frame buffer 123.

The media playback apparatus 120 of FIG. 10 and the media playback apparatus 120 of FIG. 11 as described above are embodiments for playing back and seeking media data in a frame-by-frame format and in a chunk data format, respectively. It will be apparent that the media playback apparatus 120 capable of playing back and seeking both media data in a frame-by-frame format and media data in a chunk data format can be configured by a combination of the two embodiments.

Figure 15:
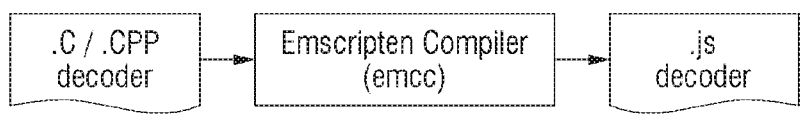
FIG. 15 illustrates a process of generating a script module implemented in JavaScript according to an exemplary embodiment.

FIG. 15 illustrates a process of generating a script module implemented in JavaScript according to an exemplary embodiment. Referring to FIG. 15, a script module implemented in JavaScript may be implemented by converting a source written in the conventional C and C++ native code using a converter such as Emscripten to obtain JavaScript code that can be used in a browser.

When using a converter such as Emscripten, it is possible to obtain a decoder or a container implemented in JavaScript from conventional native code. Accordingly, there is an advantage that codec dependency can be lowered.

Since JavaScript code is used instead of a plug-in, it is unnecessary to worry about a browser's support interruption. In addition, there is no need to worry about whether to use the ActiveX interface or the NPAPI interface depending on the browser. That is, there is an advantage that the dependency on the browser can be lowered.

Figure 16:
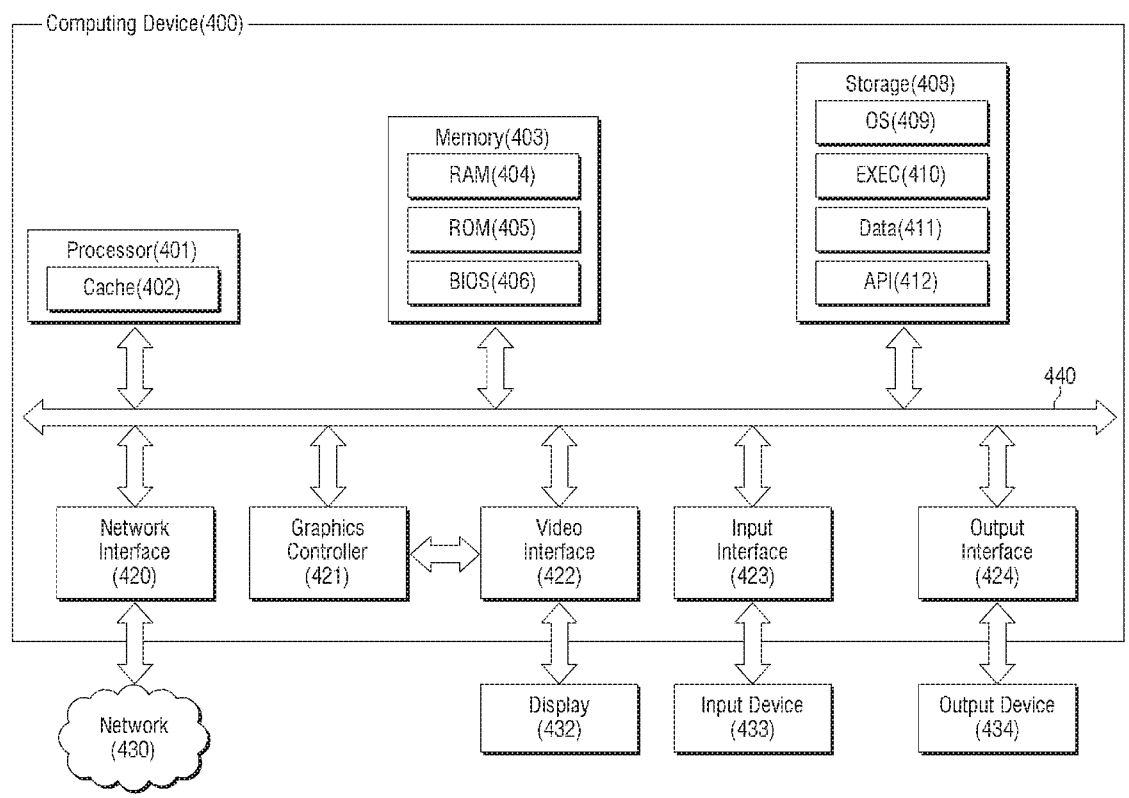
FIG. 16 illustrates a computing device for implementing the media playback apparatus according to an exemplary embodiment.

The media playback apparatus 120 shown in FIG. 1 may be implemented, for example, as a computing device 400 shown in FIG. 16. The computing device 400 may be, but is not limited to, mobile handheld devices (e.g., smart phones, tablet computers, etc.), laptop or notebook computers, distributed computer systems, computing grids or servers. The computing device 400 may include a processor 401, a memory 403 and a storage 408 that communicate with each other or with other elements via a bus 440. The bus 440 may be connected to a display 432, at least one input device 433, and at least one output device 434.

All of these elements may be connected to the bus 440 directly or via one or more interfaces or adapters. The bus 440 is connected to a wide variety of subsystems. The bus 440 may include a memory bus, a memory controller, a peripheral bus, a local bus, and a combination thereof.

The processor (e.g., a central processing unit (CPU)) 401 optionally includes a cache memory 402, which is a local storage for temporarily storing instructions, data, or computer addresses. The processor 401 executes instructions (or software modules) stored in a computer-readable storage medium, such as the memory 403 or the storage 408. The computer-readable storage medium may store software modules implementing particular embodiments, and the processor 401 may execute the stored software modules.

The memory 403 may include a random access memory (RAM) 404, a read-only memory (ROM) 405, and a combination thereof. Further, a basic input/output system (BIOS) (e.g., firmware) having basic routines necessary for booting the computing device 400 may be included in the memory 403.

The storage 408 is used to store an operating system 409, executable files (EXEC) 410, data 411, API 412, and the like. The storage 408 may be a hard disk drive, an optical disk drive, a solid-state drive (SSD), and the like.

The computing device 400 may include the input device 433. The user may enter commands and/or information into the computing device 400 via the input device 433. Examples of the input device 433 may include a keyboard, a mouse, a touch pad, a joystick, a game controller, a microphone, an optical scanner, and a camera. The input device 433 may be connected to the bus 440 via an input interface 423 including a serial port, a parallel port, a game port, a Universal Serial Bus (USB), and the like.

In some embodiments, the computing device 400 is connected to the network 430. The computing device 400 is connected to other devices via the network 430. In this case, the network interface 420 receives communication data in the form of one or more packets from the network 430, and the computing device 400 stores the received communication data for the processing of the processor 401. Similarly, the computing device 400 stores the transmitted communication data in the form of one or more packets in the memory 403, and the network interface 420 transmits the communication data to the network 430.

The network interface 420 may include a network interface card, a modem and the like. Examples of the network 430 may include the Internet, a wide area network (WAN), a local area network (LAN), a telephone network, a direct connection communication and the like, and a wired and/or wireless communication scheme may be employed.

The execution result of the software module by the processor 401 may be displayed through the display 432. Examples of the display 432 may include a liquid crystal display (LCD), an organic light-emitting display (OLED), a cathode ray tube (CRT), and a plasma display panel (PDP). The display 432 is connected to the bus 440 via a video interface 422 and the data transfer between the display 432 and the bus 440 can be controlled by a graphics controller 421.

In addition to the display 432, the computing device 400 may include at least one output device 434, such as an audio speaker and a printer. The output device 434 is coupled to the bus 440 via an output interface 424. The output interface 424 may be, for example, a serial port, a parallel port, a game port, a USB, or the like.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A media playback apparatus for playing media on a web browser that uses a HyperText Transfer Protocol (HTTP) scheme, the media playback apparatus comprising:
   at least one processor configured to:
   control to establish a communication connection between the media playback apparatus and a media service apparatus as a hypertext markup language (HTML)-based WebSocket connection that follows an HTML standard and supports a real-time streaming protocol (RTSP);
   receive media data from the media service apparatus using the hypertext markup language (HTML)-based WebSocket connection that continuously supports a bidirectional communication between the media playback apparatus and the media service apparatus;
   decode the media data by a first decoder embedded in the web browser that uses the HTTP scheme;
   decode the media data, without installing a plug-in, by a second decoder written in a script configured to be parsed by the web browser that uses the HTTP scheme;
   receive a control command that controls the media data, from a user interface; and
   decode the media data received via the hypertext markup language (HTML)-based WebSocket connection, by the first decoder embedded in the web browser that uses the HTTP scheme, in response to the control command corresponding to a playback command, and decode the media data received via the hypertext markup language (HTML)-based WebSocket connection, by the second decoder written in the script configured to be parsed by the web browser that uses the HTTP scheme without installing the plug-in, in response to the control command received from the user interface corresponding to a seek command.

2. The media playback apparatus of claim 1, wherein the at least one processor is further configured to render the media data decoded by the second decoder.

3. The media playback apparatus of claim 1, wherein in response to the seek command being inputted while the media data is decoded according to the playback command, the at least one processor stops the first decoder from decoding the media data, and in response to the playback command being inputted while the media data is decoded according to the seek command, the at least one processor stops the second decoder from decoding the media data.

4. The media playback apparatus of claim 1, wherein the second decoder is written in JavaScript, and the first decoder embedded in the web browser is a video tag module supported in Hypertext Markup Language 5 (HTML5).

5. The media playback apparatus of claim 1, wherein the seek command includes at least one of Skip Seek, Forward Seek and Backward Seek, and wherein the playback command includes at least one of Play, Stop, Pause, Rewind and Fast Forward.

6. The media playback apparatus of claim 1, further comprising:

a frame buffer configured to buffer frames to perform the seek command; and wherein the at least one processor is further configured to control to store a buffer list including identifiers of frames temporarily stored in the frame buffer.

7. The media playback apparatus of claim 6, further comprising:

a container buffer configured to perform buffering on a chunk data basis when the received media data is composed of chunk data including a plurality of frames, wherein the frame buffer is further configured to buffer the plurality of frames included in the chunk data to perform the seek command.

8. The media playback apparatus of claim 6, wherein the buffer list includes identifiers of adjacent frames at forward and backward directions with respect to a frame corresponding to a point at which playback performed by the first decoder is stopped by the seek command or a point moved by the seek command.

9. The media playback apparatus of claim 8, wherein in the corresponding frame and the adjacent frames, a number of adjacent frames in the forward direction is equal to a number of adjacent frames in the backward direction.

10. The media playback apparatus of claim 6, wherein when seeking is completed up to a final frame of the buffer list, the frame buffer resumes temporarily storing adjacent frames of the final frame.

11. The media playback apparatus of claim 1, wherein the at least one processor is further configured to decode the media data on a container basis, each container including a plurality of frames.

12. The media playback apparatus of claim 1, wherein the at least one processor is further configured to decode the media data on a frame-by-frame basis.

13. A media service apparatus for transmitting real-time live video or stored video to a media playback apparatus in real time, the media service apparatus comprising:

a module storage unit configured to store a script module to play back the real-time live video or the stored video on a web browser of the media playback apparatus, the script module being written in a script which is configured to be parsed by the web browser; wherein the web browser uses a HyperText Transfer Protocol (HTTP) scheme, and at least one processor to implement:

a module transmitting unit configured to establish a communication connection between the media playback apparatus and the media service apparatus as a hypertext markup language (HTML)-based WebSocket connection that follows an HTML standard and supports a real-time streaming protocol (RTSP), and transmit the script module to the media playback apparatus;

a packetizing unit configured to packetize the real-time live video or the stored video to generate a transmission packet; and a web server configured to transmit the transmission packet to the media playback apparatus through the HTML-based WebSocket connection that continuously supports a bidirectional communication between the media playback apparatus and the media service apparatus, in response to a control command being received from the media playback apparatus, wherein the script module is configured to;

decode the transmission packet by a first decoder embedded in the web browser that uses the HTTP scheme;

decode the transmission packet, without installing a plug-in, by a second decoder written in the script configured to be parsed by the web browser that uses the HTTP scheme;

receive the control command that controls the transmission packet, from a user interface; and decode the transmission packet received via the HTML-based WebSocket connection, by the first decoder embedded in the web browser that uses the HTTP scheme, in response to the control command corresponding to a playback command, and decode the transmission packet received via the HTML-based WebSocket connection, by the second decoder written in the script configured to be parsed by the web browser that uses the HTTP scheme without installing the plug-in, in response to the control command received from the user interface corresponding to a seek command.

14. The media service apparatus of claim 13, wherein the packetizing unit is further configured to generate the transmission packet in a container format in response to the control command corresponding to the playback command, and generate the transmission packet in a frame-by-frame format in response to the control command corresponding to a seek command.

15. The media service apparatus of claim 13, wherein the media service apparatus includes a real-time video camera or a network video recorder, and the media playback apparatus includes the web browser.

16. The media service apparatus of claim 15, further comprising a media encoder configured to compress and encode the real-time live video captured by the real-time video camera.

17. The media service apparatus of claim 13, wherein the script module includes at least one module of a Real Time Streaming Protocol/Real Time Transport Protocol (RTSP/RTP) client module configured to support RTSP/RTP communication with the media service apparatus, a depacketizing module configured to depacketize the transmission packet, a frame buffer configured to temporarily store video frames obtained through the depacketization, a decoder module configured to decode the video frames obtained through the depacketization to restore the real-time live video or the stored video, a container creating module configured to package the video frames on a container basis in response to the video frames not being packaged on a container basis, a renderer module configured to render the decoded transmission packet, and a decoding controller module configured to control which decoder among a plurality of decoders included in the media playback apparatus is to decode the transmission packet.

* * * * *